United States Patent Office 3,282,712
Patented Nov. 1, 1966

3,282,712
METHOD OF PREVENTING SCUM FORMATION IN GLASS MELTS, AND GLASS-CERAMIC PRODUCTS
Megumi Tashiro, Kyoto, and Kiyoshi Takagi, Shiga, Japan, assignors to Nippon Electric Glass Co., Ltd., Shiga, Japan
No Drawing. Filed Oct. 3, 1962, Ser. No. 227,997
Claims priority, application Japan, Mar. 31, 1962, 37/13,014; Apr. 3, 1962, 37/13,388
12 Claims. (Cl. 106—39)

This invention relates to ceramic compositions, and more particularly to semi-crystalline ceramic bodies having excellent acid resistance and a very low coefficient of expansion, and to a method of making the same.

It has been disclosed in United States Patent No. 2,920,971 that a glass containing 2 to 20 percent titanium dioxide may be reheated to convert it into a crystalline ceramic body having desirable characteristics. It is also known from Japanese patent publication No. 15,172/161 that a glass containing $TiO_2$, $Li_2O$, $Al_2O_3$, and $SiO_2$ as its primary constituents may be caused to crystallize and to form a body having an expansion coefficient of less than plus/minus $15 \times 10^{-7}$ per degree centigrade.

The nucleating agent which promotes crystallization in the known processes of producing crystalline ceramic bodies is $TiO_2$. It has heretofore been believed that the useful range of $TiO_2$ concentration in the starting material is between 3 and 7 percent, and that satisfactory crystallization cannot be attained with less than 3 percent $TiO_2$.

We have now found a glass composition which may be converted by heat treatment into a semi-crystalline transparent or opaque ceramic body; whose crystalline part exceeds 25 percent in weight of the whole body, having a coefficient of thermal expansion lower than plus/minus $20 \times 10^{-7}/°$ C. over a temperature range from 0 to 500° C. and excellent resistance to chemical attack.

The controlling components of our ceramic bodies are $ZrO_2$, $TiO_2$ and $P_2O_5$. Their concentration in the original glass and in the ultimate ceramic semi-crystalline product must be between 1 and 4 percent $ZrO_2$, between 1 and 3 percent $TiO_2$, and between 1 and 5 percent $P_2O_5$. The preferred composition, by weight, of a glass used in the method of the invention is as follows:

| | Percent |
|---|---|
| $ZrO_2$ | 1–4 |
| $TiO_2$ | 1–3 |
| $P_2O_5$ | 1–5 |
| $SiO_2$ | 55–70 |
| $Al_2O_3$ | 20–35 |
| $Li_2O$ | 3–5 |

Total of $CrO_2$, $TiO_2$, $P_2O_5$, $SiO_2$, $Al_2O_3$, $Li_2O$ is at least 95%.

The titanium and zirconium oxides employed are believed to be ionically dissolved in the initial glass. During the first of the two heat treatments employed, as will hereinafter become apparent, the oxides probably form the compounds and/or solid solutions reported to have been found by L. W. Coughenor and his co-workers (J. Res. Nat. Bur. Std., 52 (1) 39, 1954). Such compounds and solid solutions are believed to be the nucleating agents in our method of transforming the original glass into a semi-crystalline ceramic body. Crystallization is initiated in the first heat treatment.

The solubility of zirconium dioxide in glass is low. It is particularly affected by the simultaneous presence of large amounts of $SiO_2$ and even of small amounts of $Li_2O$. We have discovered that $P_2O_5$ substantially increases the solubility of $ZrO_2$ in the presence of $SiO_2$ and $Li_2O$ without unfavorable side effects on the desirable properties of the ceramic body produced.

In the absence of $P_2O_5$, a glass melt containing $ZrO_2$ forms a considerable amount of an insoluble scum which rapidly accumulates so as to make molding or pouring of the glass impractical. The scum insoluble in the molten glass mixture has been identified by X-ray analysis to be monoclinic $ZrO_2$.

We have ascertained that the amount of $ZrO_2$ present in the initial glass and in the ultimate ceramic product should not be lower than 1 percent by weight. Smaller amounts do not cause satisfactory crystallization. When an upper limit of approximately 4 percent is exceeded, heat treatment frequently produces coarse crystals. $ZrO_2$, therefore, should be held between the afore-mentioned limits of 1 and 4 percent.

A glass containing less than 1 percent $TiO_2$ cannot be transformed into a transparent partly crystalline ceramic material. A lower $TiO_2$ limit of 1 percent should be maintained if it is desired to obtain a transparent product. If the product contains more than 3 percent $TiO_2$, its resistance to chemical attack is significantly reduced. $TiO_2$ is, therefore, preferably held between the limits of 1 to 3 percent.

Less than 1 percent $P_2O_5$ does not satisfactorily prevent the formation of the afore-mentioned undesirable scum. More than 5 percent $P_2O_5$ unfavorably affect the workability of the glass. $P_2O_5$ thus is employed in quantities between 1 and 5 percent.

The preferred limits for $SiO_2$ are determined by the fact that a glass containing less than 55 percent $SiO_2$ is transformed into a ceramic body of lower chemical resistance than a body produced from a glass whose $SiO_2$ content is between the limits of 55 and 75 percent. A glass containing more than 75 percent $SiO_2$ is difficult to work.

A chemical resistance of the product decreases significantly if the $Al_2O_3$ content is raised above 35 percent and workability deteriorates with less than 20 percent $Al_2O_3$.

A $Li_2O$ content of less than 3 percent makes it difficult to produce a ceramic body which is at least partly crystallized and has a low thermal expansion coefficient. More than 5 percent $Li_2O$ promotes crystallization to the extent of making it difficult to produce the finely crystalline structure desired. $Li_2O$, therefore, should be kept between concentration limits of 3 and 5 percent.

Other conventional minor constituents of glass may be admixed to the aforediscussed essential elements of the glass composition of the invention but the amount of such admixtures should not exceed 5 percent since it may unfavorably affect chemical resistance of the ceramic body formed and interfere with the formation of fine crystals. The primary glass constituents discussed in more detail hereinabove should total at least 95 percent. If the permissible admixture of not more than 5 percent of secondary constituents includes one or more of the oxides of calcium, magnesium, barium and lead, the workability of the glass and the fluidity of its melt are improved without unfavorable effect on the ultimate ceramic product.

The glass employed as a starting material is prepared in a basically conventional way. The raw material may be held for 12 to 30 hours at 1500–1600° C. to produce a homogeneous melt and is then poured into molds, as is conventional. To refine the glass, a small amount of arsenic, for example 0.6 percent $As_2O_3$, may be added to the glass, as is usual.

The molded glass bodies are first heated to temperatures between about 700 and 860° C. for several hours, and then further heated to temperatures between about 800 and 1200 degrees centigrade. The temperature of the second heat treatment should normally be higher, and the time of the second treatment shorter than the corresponding temperatures and times of the first heat treatment. Specific examples of heat treatments will be given hereinafter together with the chemical and physical properties of the resulting ceramic products. Those skilled in the art will readily determine specific temperatures and times of heat treatment on the basis of these teachings for producing desired effects.

The coefficient of thermal expansion between 0 and 500° C. is very low after heat treatment within the above limits. Transparency is obtained by an ultimate heat treatment at relatively low temperature. Mechanical strength is normally increased by ultimate heat treatment at higher temperatures.

Tables I, II, and III respectively list the compositions of six representative batches of glass, the heat treatments employed to transform the glass into a partly crystalline material whose principal crystalline phase may consist either of β-spodumene or β-eucryptite, and certain physical and chemical properties of the ceramic bodies obtained.

The figures for acid resistance listed in Table III were obtained on flat specimens having a known surface area of at least 10 cm.$^2$. The cleaned and weighed specimens were immersed in 5% HCl solutions at 90 to 92° C. for 24 hours, washed with distilled water, dried and weighed. The weight loss in mg./cm.$^2$ is listed in Table III. The weight loss was 0.05 mg./cm.$^2$ or less in all tests made.

ing time is selected to provide proper nucleation and thereby initiation of crystallization. It is determined experimentally by taking a sample of the lot being preheated and subjecting it to the final heat treatment selected for the desired properties of the crystalline ceramic product. The final heat treating time is readily determined by inspection of the product. When the final product was transparent, X-ray analysis showed eucryptite to predominate. In white opaque products, spodumene formed the principal crystalline phase.

The first heat treatment influences inter alia the luster and transparency of the ultimate product. The final treatment basically determines the nature of the crystalline phase and the mechanical strength of the ceramic bodies produced. The good acid resistance and low thermal expansion coefficient values are obtained for the ceramic body subjected to the heat treatments of the entire range of preferred temperatures and heat treating times listed in Table II.

Because of their low coefficient of expansion and chemical resistance, the ceramic bodies made by the method of our invention are eminently suitable for use in kitchenware and for industrial equipment where resistance to thermal shock and to corrosive chemicals is required. Our ceramic bodies may be employed in many instances to replace quartz as a material of construction at substantially lower cost.

It should be understood of course that the foregoing disclosure relates only to preferred embodiments of the

*Table I*

| Batch No. | Percent by weight | | | | | | | | | |
|---|---|---|---|---|---|---|---|---|---|---|
| | $SiO_2$ | $Al_2O_3$ | $Li_2O$ | $P_2O_5$ | $ZrO_2$ | $TiO_2$ | MgO | $Na_2O$ | $K_2O$ | PbO |
| 1 | 57.5 | 27.4 | 5.0 | 4.5 | 2.4 | 1.8 | | 0.9 | 0.5 | |
| 2 | 58.5 | 28.3 | 4.8 | 2.8 | 2.3 | 1.8 | | | 0.9 | 0.6 |
| 3 | 58.0 | 28.0 | 4.6 | 3.3 | 2.8 | 1.8 | | 0.9 | | 0.6 |
| 4 | 60.0 | 22.0 | 3.3 | 4.7 | 4.0 | 1.2 | 3.7 | | 0.7 | |
| 5 | 64.2 | 23.0 | 4.6 | 2.8 | 3.0 | 1.5 | | | 0.9 | |
| 6 | 59.0 | 27.2 | 4.5 | 2.7 | 2.0 | 1.9 | | | 0.9 | 1.8 |

*Table II*

| Batch No. | First heat treatment | | Second heat treatment | | Principal crystalline phase |
|---|---|---|---|---|---|
| | °C. | Hrs. | °C. | Hrs. | |
| 1 | 720–850 | 4.0 | 1,160 | 1.0 | Spodumene. |
| | 720 | 2.0 | 810 | 1.0 | Eucrypte. |
| 2 | 750–820 | 4.0 | 1,150 | 2.0 | Spodumene. |
| | 750 | 3.0 | 820 | 0.5 | Eucryptite. |
| 3 | 750–850 | 6.0 | 1,150 | 1.0 | Spodumene. |
| | 750 | 5.0 | 850 | 0.5 | Eucryptite. |
| 4 | 700–850 | 4.0 | 950 | 0.5 | Spodumene. |
| 5 | 780–850 | 6.0 | 1,170 | 1.0 | Do. |
| 6 | 850 | 3.0 | 1,150 | 1.0 | Do. |

*Table III*

| Batch No. | Bending strength, kg./cm.$^2$ | Expansion coefficient, $10^{-7}$/deg. C. | Acid resistance, mg./cm.$^2$ | Appearance |
|---|---|---|---|---|
| 1 | 1,400 | 11.0 | 0.03 | White. |
| | 1,000 | −10 | | Transparent. |
| 2 | 1,500 | 10 | 0.01 | White. |
| | 1,200 | −7 | | Transparent. |
| 3 | 1,500 | 13.0 | | White. |
| | 1,300 | −5.0 | 0.01 | Transparent. |
| 4 | 900 | | | White. |
| 5 | 1,400 | | 0.01 | Do. |
| 6 | 1,100 | | | Do. |

The first heat treatment or preheating treatment was performed in an electric furnace heated to the first indicated temperature. The second indicated temperature of the first heat treatment, if any, was then reached within 0.5 to 10 hours. In raising the temperature from that of the first to that of the final heat treatment, we proceeded at a rate of 5° C. per minute. The total preheatinvention and that it is intended to cover all changes and modifications of the examples of the invention herein chosen for the purpose of the disclosure which do not constitute departures from the spirit and scope of the invention set forth in the appended claims.

What we claim is:

1. A thermally crystallizable glass composition comprising 1 to 4 percent $ZrO_2$, 1 to 3 percent $TiO_2$, 1 to 5 percent $P_2O_5$, 55 to 70 percent $SiO_2$, 20 to 35 percent $Al_2O_3$ and 3 to 5 percent $Li_2O$, said $ZrO_2$, $TiO_2$, $P_2O_5$, $SiO_2$, $Al_2O_3$ and $Li_2O$ totaling at least 95 percent of said composition, all percentages being percent by weight.

2. A ceramic body of at least 25% crystalline structure and resulting from the in situ thermal crystallization of a glass composition comprising 1 to 4 percent $ZrO_2$, 1 to 3 percent $TiO_2$, 1 to 5 percent $P_2O_5$, 55 to 70 percent $SiO_2$, 20 to 35 percent $Al_2O_3$ and 3 to 5 percent $Li_2O$, said $ZrO_2$, $TiO_2$, $P_2O_5$, $SiO_2$, $Al_2O_3$ and $Li_2O$ totaling at least 95 percent of said composition, all percentages being percent by weight.

3. A method of making a ceramic body of at least 25 percent crystalline structure which comprises forming a molten body of glass comprising 1 to 4 percent $ZrO_2$, 1 to 3 percent $TiO_2$, 55 to 70 percent $SiO_2$, 20 to 35 percent $Al_2O_3$ and 3 to 5 percent $Li_2O$, adding thereto 1 to 5 percent $P_2O_5$ to minimize scum formation, said $ZrO_2$, $TiO_2$, $P_2O_5$, $SiO_2$, $Al_2O_3$ and $Li_2O$ totaling at least 95 percent of said molten body, all percentages being percent by weight, forming said molten body into a solid glass body, pre-heating said solid body in a temperature range of 700° C. to 860° C. until crystallization is initiated, and then raising the temperature of the preheated body to a temperature between 800 and 1200° C. until at least a portion of said glass is crystallized.

4. The method of claim 3, wherein crystallization is initiated at a temperature not exceeding about 750° C. and the preheated body is raised to a temperature of about 1150° C. to about 1200° C. until at least a portion of said glass is crystallized.

5. The method of claim 3, wherein crystallization is initiated at a temperature not exceeding about 750° C. and the preheated body is raised to a temperature of about 800° C. to about 850° C. until at least a portion of said glass is crystallized.

6. The method of claim 3, wherein the second, higher temperature is maintained for a shorter time than the first, lower temperature.

7. The method of claim 6, wherein the second, higher temperature is maintained for no more than half the time of the first, lower temperature.

8. In a method of preventing scum formation in the production of a glass composition comprising 1 to 4 percent $ZrO_2$, 1 to 3 percent $TiO_2$, 55 to 70 percent $SiO_2$, 20 to 35 percent $Al_2O_3$ and 3 to 5 percent $Li_2O$, all percentages being by weight, the step of including 1 to 5 percent $P_2O_5$ to promote production of a homogeneous melt of said composition, said $ZrO_2$, $TiO_2$, $SiO_2$, $Al_2O_3$, $Li_2O$ and $P_2O_5$ totaling at least 95 percent of the composition.

9. In a method of making a ceramic body by the steps of forming a glass melt, forming a shaped article from said glass melt and thereafter effecting in situ thermal crystallization from the glass, the improvement which comprises employing as said glass melt a glass consisting essentially of 1–4% $ZrO_2$, 1–3% $TiO_2$, 55–70% $SiO_2$, 20–35% $Al_2O_3$, 3–5% $Li_2O$, and in addition 1–5% $P_2O_5$, to minimize scum formation and promote formation of a homogeneous glass melt, all percentages being by weight, forming a shaped article from the resulting substantially homogeneous glass melt, and thereafter heating the shaped glass article and thereby causing in situ thermal crystallization of at least a portion of said glass.

10. A method according to claim 9, wherein said in situ crystallization is effected by heating the formed glass article in an initial temperature range from 700–860° C. until crystallization is initiated and thereafter raising the temperature and further heating in a crystallization temperature range effective to form predominantly eucryptite crystals, thereby producing a transparent ceramic product.

11. A method according to claim 9, wherein said in situ crystallization is effected by heating the formed glass article in an initial temperature range from 700–860° C. until crystallization is initiated and thereafter raising the temperature and further heating in a crystallization temperature range effective to form predominantly spodumene crystals, thereby producing an opaque ceramic product.

12. A ceramic body according to claim 2 containing as the predominant crystalline phase a crystal selected from the group consisting of eucryptite and spodumene.

References Cited by the Examiner

UNITED STATES PATENTS

| | | | |
|---|---|---|---|
| 2,920,971 | 1/1960 | Stookey | 106—39 |
| 3,063,198 | 11/1962 | Babcock | 106—39 |
| 3,117,881 | 1/1964 | Henry et al. | 106—39 |
| 3,170,805 | 2/1965 | McMillan et al. | 106—39 |

FOREIGN PATENTS 1,099,135   2/1961   Germany.

OTHER REFERENCES

Tashiro and Wada: "Glass-Ceramics Catalyzed With Zirconia," paper presented July 1962 at the Sixth International Congress on Glass, copies distributed 7/8–7/14/1962.

Hinz: "Vitrokeram," Chemical Abstracts, vol. 53 (July 10, 1959), Item 12615C.

TOBIAS E. LEVOW, *Primary Examiner.*

H. McCARTHY, *Assistant Examiner.*